United States Patent
Nief et al.

[15] 3,673,406
[45] June 27, 1972

[54] ISOTOPE SEPARATION APPARATUS

[72] Inventors: Guy Nief, Paris; Jean-Pierre Morand, Arceuil, both of France

[73] Assignee: Commissariat A L'Energie Atomique, Paris, France

[22] Filed: July 18, 1969

[21] Appl. No.: 843,058

[52] U.S. Cl.................................................250/43, 204/193
[51] Int. Cl.........................................G01n 21/26, G01j 3/42
[58] Field of Search......................204/157.1 R, 193; 250/43

[56] References Cited

UNITED STATES PATENTS 2,713,025   7/1955   Billings................................204/157.1

*Primary Examiner*—William F. Lindquist
*Attorney*—Cameron, Kerkam and Sutton

[57] ABSTRACT

Apparatus for the photochemical separation of an isotope from a mixture of isotopes of an element, such as mercury, comprising at least one monoisotopic discharge lamp mounted in a fluid-tight chamber, an electrically conductive winding exciting the discharge lamp, means for circulating a liquid non-oxidizable and unreactive with the element through the chamber to continuously flush the walls of the chamber and the lamp, and an inlet and outlet in the chamber for introducing and exhausting a gaseous mixture containing the element and at least one substance which reacts with the isotope to be separated.

8 Claims, 1 Drawing Figure

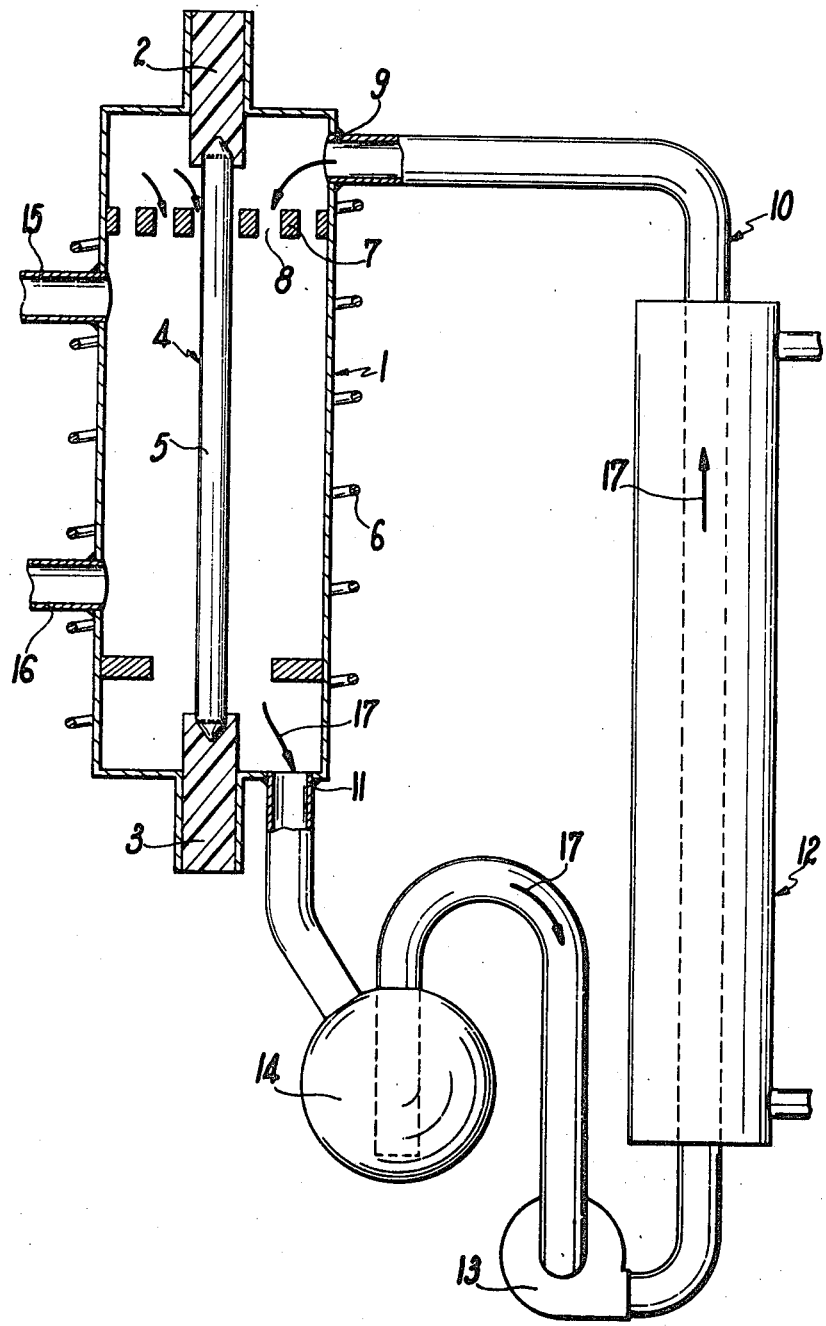

ISOTOPE SEPARATION APPARATUS

This invention relates to apparatus for extracting an isotope from a mixture of isotopes of an element, more particularly of mercury.

A known process is described in U. S. Pat. No. 2,713,025 and relates particularly to the photochemical separation of a given isotope of mercury. The process consists of vaporising the mercury in the presence of water, then irradiating the mixture of mercury isotopes by means of a radiation source which emits only the radiation exciting the isotope to be separated. This isotope is excited selectively and a chemical reaction occurs between the isotope and water which is contained in the mixture. Preferably, the radiation used has a wavelength of 2,537 A., i.e. that used for the separation of mercury isotope 198.

There are however various disadvantages in using this process, the most important being the low hourly output which makes the operation less economic. An improvement has been proposed in order to overcome this disadvantage and consists of adding to the gaseous reagent, i.e., to the water vapour in the presence of the isotope mixture, an addition agent such as oxygen, hydrochloric acid or more particularly butadiene ($C_4H_6$) or certain combinations of these substances in suitable proportions. Nevertheless, experience has shown that the mercury compound formed by the reaction of the selectively excited isotope with the gaseous mixture attaches itself essentially to the walls of the vessel in which the chemical reaction is taking place, and is rapidly decomposed under the influence of light. The immediate result of this photochemical decomposition is to restrict production of the selected mercury isotope. Furthermore, side-reactions occur on the vessel walls, contributing to the formation of a natural mercury compound and so reducing the purity of the isotope obtained.

We have now constructed a separation apparatus which substantially overcomes these disadvantages and which permits, in particular, the continuous production of a particular isotope of an element.

According to the present invention, therefore, we provide an apparatus for the photochemical separation of an isotope from a mixture of isotopes of an element, which comprises at least one monoisotopic discharge lamp mounted in a fluid-tight chamber provided with an inlet and an outlet for a liquid which is substantially non-oxidizable and substantially unreactive with the element under the operating conditions of the apparatus, the inlet and outlet being so positioned in the chamber that in operation the liquid is introduced into the upper part of the chamber, flows down around the lamp and the walls of the chamber and is discharged from the lower part of the chamber, an electrically conductive winding for a high-frequency electrical current positioned to excite the discharge lamp, and an inlet and outlet in the chamber for introducing and exhausting a gaseous mixture containing the element and at least one substance which reacts with the isotope to be separated.

Apart from these principal features, the isotope separation apparatus according to the invention may have various secondary features which may be considered separately or in combination:

the fluid-tight chamber may contain an upper plate provided with orifices for the passage of the liquid;

external to the chamber the liquid flows through a circuit comprising a flow-rate regulating reservoir, a pump and a cooler;

the liquid fluid is, for example, water, ethylene glycol or a mixture of these substances;

the discharge lamp has an envelope which is transparent to light radiation and is made from "VYCOR" (trade mark) glass;

addition agents may be added to the gaseous mixture and are water and butadiene or oxygen and butadiene.

Further features of the separation apparatus concerned will appear in the course of the following description of an embodiment, given by way of example only with reference to the accompanying drawing. This drawing illustrates such apparatus diagrammatically and partly in section.

With reference to the drawing, the apparatus consists essentially of a fluid-tight reaction chamber 1 having the general shape of a cylinder with a vertical axis. At its upper and lower ends, the chamber 1 is associated with two supports 2, 3 between which, along the axis of the chamber, a discharge lamp 4 is mounted. The transparent envelope 5 of this lamp is preferably made from "VYCOR" glass. Outside the chamber 1 is an induction coil 6 through which a high-frequency current flows and which is connected to a current generator (not shown). A transverse plate 7 is provided inside the chamber 1 near its upper end, and contains a series of orifices such as 8. One end 9 of a duct 10 leads to the space defined between the plate 7 and the upper end of the chamber 1. The other end 11 of the duct 10 is connected to the bottom end of chamber 1. This duct 10, which is for the circulation of a liquid whose characteristics will be described below, runs through a conventional cooler 12, a circulation pump 13, and a reservoir 14 by means of which the flow-rate of this fluid can be regulated. Finally, the apparatus contains two pipes 15, 16 which lead to the side of the chamber 1 and which are for the introduction and discharge, or vice versa, of a gaseous mixture constituted by a mixture of isotopes of an element, from which a particular isotope is to be separated, and by addition agents capable of reacting chemically with this isotope.

The apparatus described above is particularly suitable for separating a mercury isotope from a mixture of isotopes of this element. To this end, the apparatus operates as follows. A liquid flows continuously along the duct 10 in the direction of the arrow 17. After entering the chamber 1 at its end 9, this fluid passes through the orifices 8 in the plate 7 and is dispersed, flows down in chamber 1 and along the envelope 5 of the discharge lamp 4 as drops, and is collected by the end 11 of the duct 10, completing the circuit as little liquid as possible being collected in the bottom of chamber 1. The liquid in the circuit is cooled by the cooler 12, and the circulating pump 13 and reservoir 14 regulate and control the rate of flow. The liquid fluid may, for example, be water, ethylene glycol ($CH_2OH$—$CH_2OH$) or a mixture of these substances. The lamp 4 is a monochromatic mercury-vapour lamp, discharged by the high-frequency field created by the coil 6. The 2,537 A. radiation emitted enables a particular mercury isotope to be excited. Mercury is introduced in a vapour state into the chamber 1 through the pipe 15 or 16, the excited isotope giving with the gaseous reagent mixed with the mercury a reaction product which tends to be deposited on the walls of the chamber and on the envelope of the discharge lamp. The gaseous mixture is discharged through the other pipe 16 or 15. Advantageously, the gaseous reagent is water and butadiene or oxygen and butadiene. The mercury compound formed is dissolved in the liquid, from which it is extracted.

Because it operates continuously, the separation apparatus described enables the disadvantages mentioned with regard to known apparatus to be substantially overcome. The liquid constantly flowing through the reaction chamber both enables the mercury compound resulting from the chemical reaction with the gaseous reagent to be extracted, by constantly flushing the walls of this chamber and the discharge lamp, and also provides effective cooling for the lamp. In particular, the mercury compound does not decompose photochemically since it is extracted as it is formed. Also, the apparatus described can be used over a wide pressure range, provided that a compromise is found between the low pressures, at which separation is efficient but the quantity of mercury isotope obtained is small, and the high pressures at which separation is less efficient but the quantity of isotope is greater. At high pressures, moreover, the absorption broadens over a wider range of wavelengths so that the excitation is no longer selective.

The invention is by no means restricted to the embodiment particularly described and shown. On the contrary, it covers all variants of this embodiment. In particular, many apparatus as described might be used, mounted in cascade or in parallel, in order to form production units with high outputs. It should be emphasized that the apparatus can be used not only for the selective separation of a mercury isotope, but for the photochemical irradiation of any substance, to give any product which can be carried by an appropriate fluid.

What we claim is:

1. An apparatus for the photochemical separation of an isotope from a mixture of isotopes of an element, comprising a fluid-tight chamber, at least one monoisotopic discharge lamp mounted in said fluid-tight chamber, an inlet and an outlet in said chamber for a liquid which is substantially non-oxidizable and substantially unreactive with the element under the operating conditions of the apparatus, said inlet and said outlet being so positioned in said chamber that the liquid is introduced into the upper part of said chamber, then flows down around said lamp and the walls of said chamber and is discharged from the lower part of said chamber, an electrically conductive winding for a high-frequency electrical current positioned around said chamber to excite said lamp, and an inlet and outlet in said chamber for introducing and exhausting a gaseous mixture containing the element and at least one substance reacting with the isotope to be separated.

2. An apparatus according to claim 1, including in said chamber a perforated upper plate beneath said liquid inlet for dispersion of the liquid.

3. An apparatus according to claim 1 including outside of said chamber, a circuit for the liquid having in series a flow-rate regulating reservoir, a pump and a cooler.

4. An apparatus according to claim 1, the liquid being water.

5. An apparatus according to claim 1, the liquid being ethylene glycol.

6. An apparatus according to claim 1, the liquid being a mixture of water and ethylene glycol.

7. An apparatus according to claim 1, said lamp having an envelope transparent to light radiation.

8. An apparatus according to claim 1, the isotope to be separated being a mercury isotope.

* * * * *